United States Patent
Prasad et al.

(10) Patent No.: US 11,330,018 B1
(45) Date of Patent: *May 10, 2022

(54) DETERMINING POLICY CHARACTERISTICS BASED ON ROUTE SIMILARITY

(71) Applicant: United Services Automobile Association (USAA), San Antonio, TX (US)

(72) Inventors: Bharat Prasad, San Antonio, TX (US); Vijay Jayapalan, San Antonio, TX (US); Michael Kyne, Saint Petersburg, FL (US); Joel T. Camarano, San Antonio, TX (US); Charles Lee Oakes, III, Boerne, TX (US); Gunjan C. Vijayvergia, San Antonio, TX (US); Christine Marie Brown, Helotes, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 73 days.

This patent is subject to a terminal disclaimer.

(21) Appl. No.: 16/997,284

(22) Filed: Aug. 19, 2020

Related U.S. Application Data

(63) Continuation of application No. 16/822,327, filed on Mar. 18, 2020, which is a continuation of application
(Continued)

(51) Int. Cl.
*H04L 29/06* (2006.01)

(52) U.S. Cl.
CPC .......... *H04L 63/20* (2013.01); *H04L 63/0227* (2013.01)

(58) Field of Classification Search
CPC .......................... H04L 63/20; H04L 63/0227
See application file for complete search history.

(56) References Cited

U.S. PATENT DOCUMENTS

| | | |
|---|---|---|
| 7,184,919 B2 | 2/2007 | Carbonell et al. |
| 8,140,358 B1 | 3/2012 | Ling et al. |
| | (Continued) | |

FOREIGN PATENT DOCUMENTS

| | | |
|---|---|---|
| WO | WO 2010/062899 | 6/2010 |

OTHER PUBLICATIONS

U.S. Appl. No. 15/367,707, Prasad et al., filed Dec. 2, 2016.
(Continued)

*Primary Examiner* — Viral S Lakhia
(74) *Attorney, Agent, or Firm* — Fish & Richardson P.C.

(57) ABSTRACT

Techniques are described for adjusting policy characteristics based on a determined similarity between routes. A similarity metric may be determined indicating the similarity between a first route followed by a vehicle and/or driver and a second (e.g., previous) route followed by the vehicle and/or driver. A similarity metric may indicate the similarity in movements, and changes in movement, exhibited by the vehicle on the routes. The similarity metric may be determined through analysis of real time data collected by in-vehicle sensor(s), mobile user device(s), external sensors or other data sources. Based on the similarity metric, a premium, a deductible, a price, or other characteristic(s) of a policy may be determined. In some examples, policy characteristics may be adjusted (e.g., in real time) based on the analysis according to changing risk conditions if a driver is following routes that are dissimilar from typical routes.

17 Claims, 8 Drawing Sheets

Related U.S. Application Data

No. 15/367,737, filed on Dec. 2, 2016, now Pat. No. 10,630,723.

(60) Provisional application No. 62/262,506, filed on Dec. 3, 2015.

(56) References Cited

U.S. PATENT DOCUMENTS

| | | | |
|---|---|---|---|
| 8,768,734 B2 | 7/2014 | Gryan et al. | |
| 8,799,035 B2 | 8/2014 | Coleman et al. | |
| 8,848,608 B1 | 9/2014 | Addepalli et al. | |
| 8,892,451 B2 | 11/2014 | Everett et al. | |
| 9,053,469 B1 | 6/2015 | Bohanek et al. | |
| 9,086,948 B1 * | 7/2015 | Slusar | G01S 5/0284 |
| 9,141,582 B1 | 9/2015 | Brinkimaim et al. | |
| 9,305,317 B2 * | 4/2016 | Grokop | H04R 3/002 |
| 9,344,683 B1 | 5/2016 | Nennat-Nasser et al. | |
| 9,390,452 B1 * | 7/2016 | Biemer | B60W 10/30 |
| 9,503,466 B2 | 11/2016 | Vasseur et al. | |
| 9,513,132 B2 | 12/2016 | Fowe | |
| 9,633,562 B2 | 4/2017 | Nathanson | |
| 9,692,900 B1 | 6/2017 | Sufian et al. | |
| 9,806,902 B2 | 10/2017 | Srivastava et al. | |
| 9,818,240 B1 | 11/2017 | Brenner | |
| 9,820,108 B1 | 11/2017 | Inciong et al. | |
| 9,830,665 B1 | 11/2017 | Healy et al. | |
| 9,922,469 B1 * | 3/2018 | Ashton | G07C 5/0825 |
| 9,950,722 B2 * | 4/2018 | Kumar | B61L 27/0027 |
| 9,984,420 B1 | 5/2018 | Manzella et al. | |
| 10,002,531 B2 * | 6/2018 | Lynch | G08G 1/0112 |
| 10,074,139 B2 * | 9/2018 | Bogovich | G06Q 10/0635 |
| 10,096,038 B2 * | 10/2018 | Ramirez | G06Q 10/0635 |
| 10,185,999 B1 | 1/2019 | Konrardy et al. | |
| 10,223,751 B1 | 3/2019 | Hutchinson et al. | |
| 10,445,758 B1 * | 10/2019 | Bryer | G06Q 40/08 |
| 10,664,917 B1 * | 5/2020 | Wasserman | G01C 21/3453 |
| 10,977,255 B2 | 4/2021 | Vij et al. | |
| 2002/0111725 A1 | 8/2002 | Burge | |
| 2002/0111738 A1 | 8/2002 | Iwami et al. | |
| 2004/0153362 A1 | 8/2004 | Bauer et al. | |
| 2007/0027726 A1 | 2/2007 | Warren et al. | |
| 2007/0282638 A1 | 12/2007 | Surovy | |
| 2008/0033637 A1 | 2/2008 | Kuhlman et al. | |
| 2008/0161987 A1 | 7/2008 | Breed | |
| 2010/0131300 A1 | 5/2010 | Collopy et al. | |
| 2010/0174566 A1 | 7/2010 | Helitzer et al. | |
| 2011/0184588 A1 | 7/2011 | Brusilovsky et al. | |
| 2012/0123806 A1 | 5/2012 | Schumann, Jr. et al. | |
| 2012/0166229 A1 | 6/2012 | Collins et al. | |
| 2012/0209634 A1 | 8/2012 | Ling et al. | |
| 2013/0006674 A1 | 1/2013 | Bowne et al. | |
| 2013/0046559 A1 | 2/2013 | Coleman et al. | |
| 2013/0231862 A1 | 9/2013 | Delling et al. | |
| 2013/0304515 A1 | 11/2013 | Gryan et al. | |
| 2013/0317862 A1 | 11/2013 | Fernandes et al. | |
| 2014/0009308 A1 | 1/2014 | Abuelsaad et al. | |
| 2014/0012494 A1 | 1/2014 | Cudak et al. | |
| 2014/0019170 A1 | 1/2014 | Coleman et al. | |
| 2014/0019171 A1 | 1/2014 | Koziol | |
| 2014/0074402 A1 | 3/2014 | Hassib et al. | |
| 2014/0108058 A1 | 4/2014 | Bourne et al. | |
| 2014/0257867 A1 | 9/2014 | Gay et al. | |
| 2014/0257869 A1 | 9/2014 | Binion et al. | |
| 2014/0257870 A1 | 9/2014 | Cielocha et al. | |
| 2014/0308635 A1 | 10/2014 | Ciobanu et al. | |
| 2015/0006207 A1 | 1/2015 | Jarvis et al. | |
| 2015/0025917 A1 | 1/2015 | Stempora | |
| 2015/0032481 A1 | 1/2015 | Norling-Christensen et al. | |
| 2015/0066542 A1 | 3/2015 | Dubens | |
| 2015/0066543 A1 | 3/2015 | Dubens | |
| 2015/0112543 A1 | 4/2015 | Binion et al. | |
| 2015/0161538 A1 | 6/2015 | Matus et al. | |
| 2015/0170287 A1 | 6/2015 | Tirone et al. | |
| 2015/0175067 A1 | 6/2015 | Keaveny et al. | |
| 2015/0178953 A1 | 6/2015 | Gao et al. | |
| 2015/0187019 A1 | 7/2015 | Fernandes et al. | |
| 2015/0266455 A1 | 9/2015 | Wilson | |
| 2015/0294422 A1 | 10/2015 | Carver et al. | |
| 2015/0332518 A1 | 11/2015 | Menon et al. | |
| 2016/0078695 A1 * | 3/2016 | McClintic | G07C 5/0816 701/29.4 |
| 2016/0086285 A1 | 3/2016 | Jordan Peters et al. | |
| 2016/0086393 A1 | 3/2016 | Collins et al. | |
| 2016/0114808 A1 | 4/2016 | Mellinger et al. | |
| 2016/0163186 A1 | 6/2016 | Davidson et al. | |
| 2016/0320200 A1 | 11/2016 | Delling et al. | |
| 2017/0011465 A1 * | 1/2017 | Anastassov | G06Q 40/08 |
| 2017/0016733 A1 | 6/2017 | Rolf | |
| 2018/0356237 A1 | 12/2018 | Abramson et al. | |
| 2019/0102840 A1 | 4/2019 | Perl et al. | |

OTHER PUBLICATIONS

U.S. Appl. No. 15/367,737, Prasad et al., filed Dec. 2, 2016.
U.S. Appl. No. 15/380,616, Prasad et al., filed Dec. 15, 2016.
U.S. Appl. No. 15/380,634, Prasad et al., filed Dec. 15, 2016.
Dong, "An overview of in-vehicle route guidance system," Sep. 28-30, 2011, Australasian Transport Research Forum 2011 Proceedings, available at URL <https://pdfs.semanticscholar.org/509d/f01b3a4e0c41cdca820795d0901c8644cc2e.pdf>, 12 pages.
U.S. Non-Final Office Action issued in U.S. Appl. No. 15/380,616, dated Oct. 11, 2018, 29 pages.
U.S. Non-Final Office Action issued in U.S. Appl. No. 15/380,634, dated Oct. 19, 2018, 35 pages.
USPTO Final Office Action issued in U.S. Appl. No. 15/367,707, dated Jun. 26, 2020, 40 pages.
USPTO Non-Final Office Action issued in U.S. Appl. No. 15/367,707, dated Mar. 5, 2020, 38 pages.
USPTO Reply to Action of Mar. 5, 2020 in U.S. Appl. No. 15/367,707, dated Jun. 5, 2020, 16 pages.

* cited by examiner

DETERMINING POLICY CHARACTERISTICS BASED ON ROUTE SIMILARITY

CROSS-REFERENCE TO RELATED APPLICATIONS

This application is a continuation application of and claims priority under 35 U.S.C. § 120 to U.S. application Ser. No. 16/822,327, filed on Mar. 18, 2020, which is a continuation application of and claims priority to U.S. application Ser. No. 15/367,737, filed on Dec. 2, 2016, now U.S. Pat. No. 10,630,723, which is related to, and claims priority to, U.S. Provisional Patent Application Ser. No. 62/262,506, titled "Determining Policy Characteristics Based On Route Similarity," which was filed on Dec. 3, 2015, the entire contents of each of which are incorporated herein by reference. The present disclosure is also related to U.S. patent application Ser. No. 15/367,707, titled "Determining Policy Characteristics Based On Route Similarity," which was filed on Dec. 2, 2016, the entirety of which is hereby incorporated by reference into the present disclosure.

BACKGROUND

Insurance companies gather information regarding insured parties and use such data to determine pricing for insurance policies. For example, an auto insurance company may use data regarding driver's location, age, vehicle, driving history, or other information to determine a premium or a deductible of an auto insurance policy for the driver. Traditionally, data regarding a policy holder or a vehicle may be self-reported by policy holder, or may be reported by third parties such as repair shops, government agencies, or other drivers. Because such data may be infrequently or inconsistently reported, the data may become out-of-date over time. Accordingly, an insurance company may have difficulty developing and maintaining an accurate, current evaluation of the risk associated with insuring an individual.

SUMMARY

Implementations of the present disclosure are generally directed to adjusting characteristic(s) of a policy based on analysis of dynamic data collected during trip(s) taken by a vehicle and/or static data associated with the trip(s). More particularly, implementations of the present disclosure are directed to determining similarity metric(s) indicating the similarity between routes taken in a vehicle, and adjusting policy characteristic(s) based on the similarity metric(s). Implementations are also directed to determining recommended route(s) based on the similarity metric(s) indicating similarity between previous trip(s) and future, or current, trip(s).

In general, innovative aspects of the subject matter described in this specification can be embodied in methods that includes actions of: based on data collected by one or more sensors during trips by one or more vehicles, determining changes in movement of the one or more vehicles during the trips; determining a similarity metric for at least one pair of the trips that includes a first trip and a second trip, the similarity metric based at least partly on a similarity between the changes in movement during the first trip and the changes in movement during the second trip; based at least partly on the similarity metric, determining at least one characteristic of at least one policy associated with one of the one or more vehicles; and providing the at least one characteristic of the at least one policy for presentation in a user interface on a computing device.

Implementations can include one or more of the following features: accessing risk data describing a risk of the first trip; determining a risk of the second trip based on: the risk of the first trip; and the similarity metric for the first trip and the second trip; and based at least partly on the similarity metric for the first trip and the second trip, determining the at least one characteristic of the at least one policy associated with the second trip based at least partly on the risk of the second trip; the risk data describes a history of incidents that occurred on a route corresponding to the first trip; accessing static data describing one or more of a road characteristic, a terrain characteristic, or a neighborhood characteristic of a route corresponding to the second trip; and the risk of the second trip is further based on the static data; the first trip and the second trip have different starting locations; the first trip and the second trip have different ending locations; or the first trip and the second trip have different starting locations and different ending locations; the data indicates one or more of: changes in speed of the vehicle; or changes in orientation of the vehicle; the one or more sensors include one or more of: a sensor incorporated into the vehicle; a sensor incorporated into at least one other vehicle; a sensor included in a mobile computing device of a driver of the vehicle; a sensor included in a mobile computing device of a driver of the at least one other vehicle; or an external sensor in proximity to the vehicle during at least one of the plurality of times; the at least one characteristic of the policy includes one or more of: a coverage type; a coverage amount; a deductible amount; a premium amount; or a price; the at least one policy includes one or more of: a vehicle insurance policy for a vehicle on the second trip; a life insurance policy for a driver of the vehicle; or a health insurance policy for the driver of the vehicle; the data further indicates one or more dynamic conditions present during the first trip and the second trip; the one or more dynamic conditions include one or more of: a time of day; a day of the week or month; a weather condition; a road condition; a number other vehicles; a traffic condition (e.g., an accident or absence thereof, congestion or absence thereof) independent of or dependent on a number of other vehicles in the vicinity; and/or a presence of a repair crew; and the similarity metric is further based on a similarity between the one or more dynamic conditions present during the first trip and the second trip.

Other implementations of any of the above aspects include corresponding systems, apparatus, and computer programs that are configured to perform the actions of the methods, encoded on computer storage devices.

Implementations of the present disclosure provide one or more of the following technical advantages and/or improvements compared to traditional systems. Dynamic sensor data describing the movement, location, condition, or other operational characteristics of a vehicle may be received and analyzed (e.g., in real time) to determine a complexity of a trip or a similarity between the trip and other trips. One or both of the complexity or similarity may be employed to (e.g., dynamically) set insurance premiums or other policy characteristics for a driver, and (e.g., dynamically) recommend routes that minimize accident risk for the driver. By employing dynamic sensor data to generate outputs such as route recommendations and/or policy characteristic determinations, implementations provide route recommendations and/or policy characteristic determinations that are more accurate and/or more up-to-date compared to traditional systems that may employ static and/or out-of-date information. Accordingly, traditional systems may need to recalculate their outputs frequently if they are to remain current and accurate, thus consuming more processing power, storage space, network capacity, active memory, and/or other computing resources compared systems according to the implementations described herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
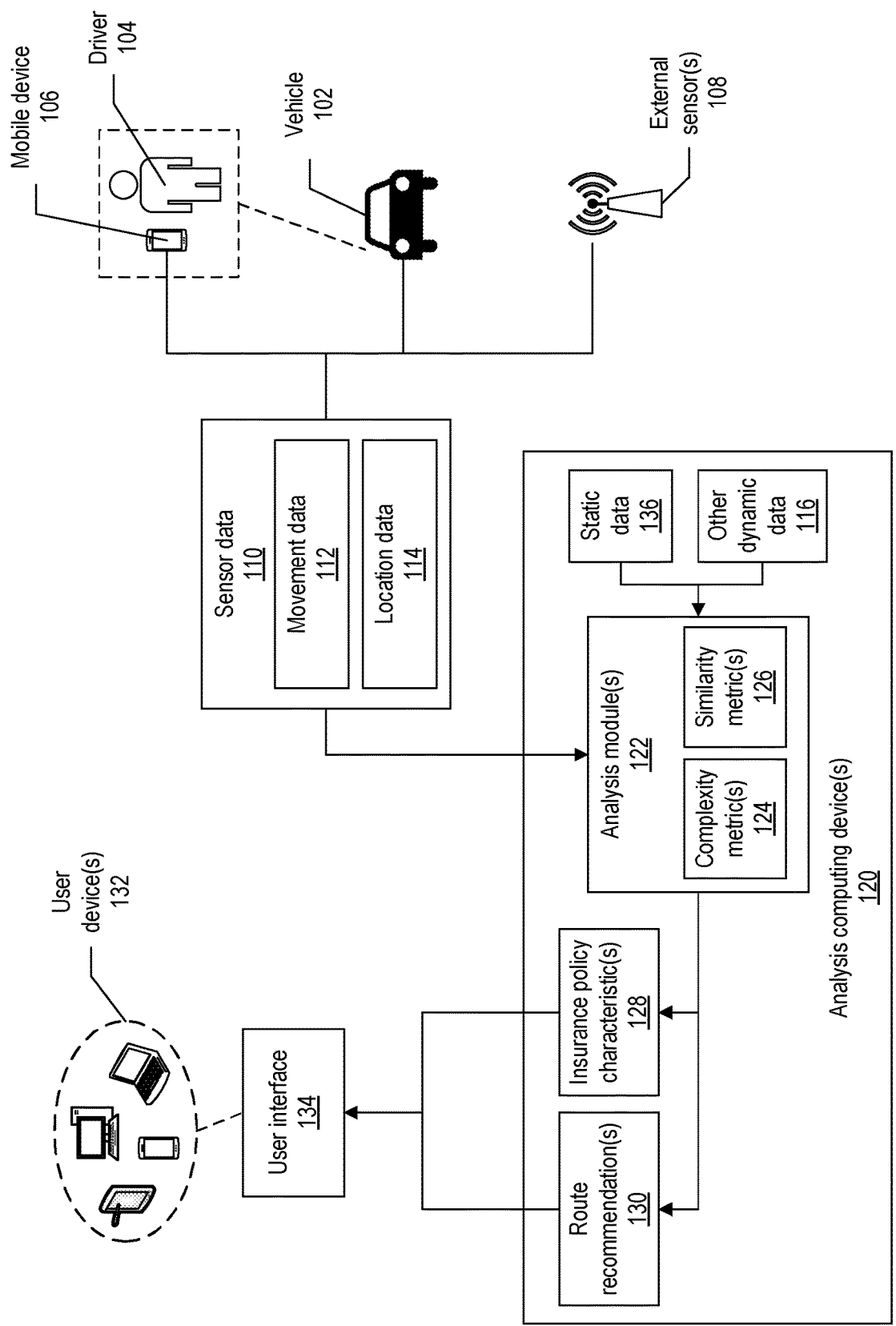
FIG. 1 depicts an example environment according to implementations of the present disclosure.

Implementations of the present disclosure are directed to systems, devices, methods, and computer-readable media for collecting real time, dynamic data describing the operations of a vehicle, and analyzing the data to determine one or more characteristics of a policy such as a vehicle (e.g., auto) insurance policy, life insurance policy, and/or health insurance policy. The dynamic data may include data collected by sensors in the vehicle (e.g., in the interior or on the exterior of the vehicle), such as telematics sensors or sensors included in an in-vehicle computing device. The dynamic data may also include data collected by a mobile device (e.g., smartphone, tablet computer, wearable computer) of an operator of the vehicle. In some examples, dynamic data includes data collected by external sensors in proximity to the vehicle. The sensor data from the various sensors may be analyzed to determine one or more complexity metrics or similarity metrics that describe the operations of the vehicle during one or more trips. Based on one or more of the complexity metrics or the similarity metrics, a premium, a deductible, a price, a reward, or other characteristic(s) of an insurance policy may be determined. In some examples, the sensor data may be analyzed dynamically (e.g., in real time) during a trip of the vehicle or the driver, and insurance policy characteristics may be adjusted (e.g., in real time) based on the analysis according to changing risk conditions.

In some implementations, the complexity metric may be based at least in part on an amount of time between changes in movement of the vehicle, such as changes in speed, direction, or orientation. A higher complexity metric (e.g., with more frequent changes) may cause a deductible, a premium, a price, or other policy characteristic to be set higher, given that higher frequency changes in speed, direction, or orientation may correlate with riskier driving practices that may have a higher probability of causing an accident or other incident.

In some implementations, the similarity metric may describe a degree of similarity between the changes in movement previously performed (or to be performed) on a pair of trips. If a driver takes routes that are similar based on the exhibited changes in movement of the vehicle during the routes, a deductible, a premium, a price, or other policy characteristic may be set lower given that the risk of an accident or other incident may be lower if the driver is using similar routes. In some implementations, a route is recommended for a driver based on a similarity between the recommended route and other routes previously used by the driver.

In some implementations, other types of data may also be employed to determine one or more of the complexity metric or the similarity metric. The other types of data may include other types of dynamic data, such as time of day, day of week or month, current weather conditions, current traffic conditions, current road conditions, current road maintenance or repair projects, events currently underway in the vicinity of the vehicle (e.g., sporting events, concerts, festivals), or other dynamic data. The other types of data may also include static data, such as information regarding road layout or configuration, the terrain, characteristics of the neighborhood(s) in the vicinity of the vehicle, or other static data. The other types of data may include crash data indicating the dates, times, locations, and other characteristics of auto accidents or other incidents. Such data may be available from insurance companies, government agencies (e.g., departments of transportation), news agencies, or other sources. In some examples, crash data may be dynamic, reflecting current or recent accidents or incidents. Crash data may also include historical data describing past accidents or incidents, such as the accident history for a particular area, road, portion of road, and so forth.

As used herein, dynamic data may describe data that is changeable or changing within a relatively short time scale, such as data that may change every minute, hour, day, week, and so forth. Static data may describe data that is less likely to change within the relatively short time scale, such that the data may be consistent over a period of days, weeks, months, years, and so forth. In some examples, the time scale relevant to static or dynamic data may be on the order of the duration of a particular trip by a vehicle. For example, with respect to a three-hour car trip, dynamic data may include any data that is changeable over the course of three hours, whereas static data may include any data that is unlikely to change over the course of three hours.

In some implementations, data is collected and analyzed in real time. In accordance with implementations described herein, real time actions may include actions that can be automatically executed, without requiring human input and without any intentional delay, taking into account the processing limitations of the computing system(s) performing the actions and the time needed to perform the actions. The data, such as the dynamic data describing the movement of a vehicle, may be analyzed in real time with respect to the collection of the data. For example, there may be no intentional delay between the collection of the data and the analysis of the data, beyond the latency incurred in communicating the data over network(s) and performing the analysis operations on computing system(s).

The complexity of a trip may be employed as a proxy for the risk level of the trip, and an insurance policy may be priced higher if the driver is taking trips that are more complex and therefore incurring higher risk. The frequency of changes in movement (e.g., how frequently the vehicles changes speed or direction) may be used to calculate a complexity metric that indicates the level of complexity of a trip, and the complexity metric may be employed in determining the price of an insurance policy.

Similarity can also be used as a proxy for the risk level of a trip. A driver may be engaging in higher risk behavior if the driver is following routes that are dissimilar from the routes normally taken by the driver. The driver may be engaging in lower risk behavior if the driver is following routes that are similar to the driver's typical routes, even if the current routes are in a different geographical region than the driver's typical routes. For example, the driver may normally take a particular route or type of route in the US and, to lower the risk level, implementations may recommend a similar route when the driver travels abroad. Similarity between trips may be based on trip characteristics such as distance, speed changes, direction changes, type of road, type of neighborhood, terrain, and so forth.

As used herein, a risk or a risk level associated with an individual may include a determined probability that an accident involving the individual may occur during a given period of time. For example, a risk or risk level of 0.0015 may indicate a 0.15% chance of an accident occurring during a one-week period. A risk or risk metric associated with an individual may also include a determined cost of an accident that may involve an individual, e.g., where the cost is adjusted based on a probability that such an accident may occur. For example, where there is a 0.15% chance of an accident occurring during a one-week period, and where the cost of such an accident would be $100,000, the risk or risk level may be determined to be 150. Implementations support the use of other suitable risk or risk levels.

FIG. 1 depicts an example environment according to implementations of the present disclosure. As shown in the example of FIG. 1, the environment may include one or more vehicles 102. Although examples may describe the vehicle 102 as an automobile (e.g., car), implementations are not so limited. The vehicle 102 may include any form of conveyance, such as automobiles, trucks, recreational vehicles (RVs), motorcycles, scooters, military vehicles, trains, buses, watercraft (e.g., boats), submersible vehicles (e.g., submarines), heavier-than-air aircraft (e.g., airplanes), lighter-than-air aircraft (e.g., dirigibles), spacecraft, and so forth. The vehicle 102 may be powered by one or more motors or engines using any fuel. The vehicle 102 may also be a human-powered or animal-powered vehicle such as a bicycle, skateboard, rowboat, kayak, horse-drawn carriage, and so forth. The vehicle 102 may include various sensors that collect sensor data 110 describing the location, orientation, movement, or other operations of the vehicle 102, as described further below. The sensor data 110 may be communicated using one or more network interfaces (e.g., transceivers) incorporated into the vehicle 102.

The vehicle 102 may be operated by a driver 104. The driver 104 may include one or more individuals who operate, or travel within, the vehicle 102. Although examples herein describe a driver 104 of a car, implementations are not so limited. Accordingly, the driver 104 may be any operator or occupant of a vehicle 102, such as a pilot of an airplane, a sailor of a ship, a rider of a bicycle, and so forth. Although examples herein may describe the driver 104 as a person, implementations are not so limited. In some implementations, the driver 104 may include computer hardware and/or computer software component(s) that autonomously, or semi-autonomously, operate the vehicle 102. For example, a human driver 104 may be assisted by, or replaced by, an artificial intelligence, a robot, or any other combination of hardware and/or software component(s) configured to operate a vehicle 102. In some examples, the driver 104 may carry, wear, or otherwise be in proximity to a mobile device 106 such as a smartphone, tablet computer, wearable computer, implanted computer, and so forth. The mobile device 106 may include any number of sensors that generate sensor data 110 describing the location, movement, orientation, or other status information regarding the mobile device 106. Such sensor data 110 may be communicated, using one or more network interfaces (e.g., transceivers) of the mobile device 106.

In some implementations, the environment includes one or more external sensors 108. The external sensor(s) 108 may be external from but in proximity to the vehicle(s) 102 at one or more times, and may be configured to collect sensor data 110 regarding the location, speed, orientation, or other characteristics of the vehicle 102. For example, external sensors may employ radar, sonar, infrared, radio-frequency identification sensors, or optical sensors to detect the presence of the vehicle 102 in proximity to the external sensor 108, and measure the vehicle's position, speed, acceleration, and orientation. Such information may be communicated as sensor data 110 using one or more wired or wireless network interfaces (e.g., transceivers) that are incorporated into the external sensor(s) 108 or that are communicatively coupled to the external sensor(s) 108.

One or more sensors in the vehicle 102 or the mobile device 106, or the external sensor(s) 108, may collect sensor data 110 describing the operations of the vehicle 102. The sensor data 110 may be dynamic data that describes a current (e.g., real time) state of the vehicle 102 with regard to its position, orientation, speed, acceleration, deceleration (e.g., braking), direction of travel, or other characteristics. In some implementations, the sensor data 110 includes movement data 112 that indicates changes in one or more of the speed, the direction, or the orientation of the vehicle 102. The orientation or direction of the vehicle 102 may include orientation or direction relative to any reference axis. Accordingly, orientation or direction may include yaw, pitch, roll, or other indications of orientation relative to any axis.

The sensor data 110 may also include location data 114 that describes the location, or position, of the vehicle 102. The location data 114 may be determined using any technique, and may be determined to any degree of specificity. For example, the vehicle 102 or mobile device 106 may include location sensor(s), transceiver(s), other hardware component(s), or other software component(s) configured to determine the location of the vehicle 102 or mobile device 106 using one or more of the following: an inertial navigation system, a dead-reckoning navigation system, a network positioning system, a radio position finding system, a satellite-based navigation system, an accelerometer system, a gyroscope system, and so forth. The satellite-based navigation system may include one or more of a Global Positioning System (GPS) receiver, a Globalnaya Navigatsionnaya Sputnikovaya Sistema (GLONASS) receiver, a Galileo receiver, an Indian Regional Navigational Satellite System, and so forth. The location may also be determined through geolocation based on an Internet Protocol (IP) or other address of a network interface in the mobile device 106 or the vehicle 102. In some examples, the location may be determined based on previously collected information describing the vehicle 102, the mobile device 106, or the driver 104, such as a previously specified address or other location information for the driver 104, vehicle registration information, and so forth. One or both of the movement data 112 or the location data 114 may include timestamp data describing a time, a date, or both a time and date when each movement change occurred or when the vehicle 102 (or mobile device 106) was at each location.

The sensor data 110 may also include other information that describes the vehicle 102 or the driver 104. For example, the sensor data 110 may include information regarding the condition of the vehicle 102, such as the odometer reading, fuel efficiency, current status of fuel or other fluids, temperature, weight, number of wheels, tire condition, drive train condition, and so forth. The sensor data 110 may also indicate dynamic road conditions, such as whether the road is icy, wet, or dry, banked or not banked, flat, inclined, and so forth.

The sensor data 110 may be communicated over one or more wired or wireless networks (not shown) to one or more analysis computing devices 120. In some implementations, the mobile device 106 may be connected to a communications port in the vehicle 102, and the mobile device 106 may receive sensor data 110 in the form of onboard diagnostics (OBD) and/or telematics data from vehicle systems. Such sensor data 110 may then be communicated to the analysis computing device(s) 120. In some implementations, the vehicle 102 may include a wireless transceiver that communicates sensor data 110 (e.g., OBD and/or telematics data) to the analysis computing device(s) 120. The mobile device 106, vehicle 102, and/or external sensor(s) 108 may communicate sensor data 110 to the analysis computing device(s) 120 directly or via one or more intermediary device(s). In some implementations, the mobile device 106 may generate and send telematics data that is determined independently of onboard systems of the vehicle 102, and which may be described as mobile-only telematics data. For example, the mobile device 106 may generate information regarding the location, orientation, speed, and/or acceleration of the vehicle 102 based on the determined location, orientation, speed, and/or acceleration of the mobile device 106 as determined using sensors (e.g., gyroscopic sensors, accelerometers, location sensing technology, etc.) included in the mobile device 106. The mobile device 106 collecting such data may be a computing device such as a smartphone, tablet computer, and so forth. The mobile device 106 collecting the data may also be a stand-alone device (e.g., dongle) that includes various sensor device(s) and wireless transceiver for transmitting the collected sensor data. Such a stand-alone device may be headless, e.g., lacking a user interface of its own. The stand-alone device may connect to a port in the vehicle 102 to receive power and/or data from various vehicle systems.

In some implementations, a user (e.g., driver 104) may receive reward(s) for agreeing to provide sensor data 110 from their mobile device 106 and/or vehicle 102 to the analysis computing device(s) 120. For example, the user may be given a monetary reward, discount on premiums, points redeemable toward purchase of products or services, and/or other types of value.

The analysis computing device(s) 120 may execute one or more analysis modules 122 that are configured (e.g., as software) to analyze the sensor data 110. In some implementations, the analysis module(s) 122 analyze the sensor data 110 to generate one or more complexity metrics 124. In some implementations, the analysis module(s) 122 analyze the sensor data 110 to generate one or more similarity metrics 126.

In some examples, the analysis module(s) 122 may also employ other dynamic data 116 to determine one or both of the complexity metric(s) 124 or the similarity metric(s) 126. Other dynamic data 116 may include, but is not limited to, one or more of the following: current road conditions; traffic conditions (e.g., rush hour); current weather conditions (e.g., rain, snow, clear); current road repairs, construction, or maintenance information; event information (e.g., sporting events, concerts, festivals, parades); time of day (e.g., day vs. night); season (e.g., winter vs. summer); other vehicles on the route (e.g., large trucks or trailers); position of the sun (e.g., driving into the sun or away from the sun); historical or current crash data (e.g., traffic incidents); and so forth. The other dynamic data 116 may be generated and received from the sensors in the vehicle 102 or the mobile device 106, or from the external sensor(s) 108. In some examples, at least a portion of the other dynamic data 116 may be reported by the driver(s) 104 of vehicle(s) 102. The other dynamic data 116 may also be received from third party data providers, such as weather services, government road maintenance departments, local news sources, traffic services, and so forth. The other dynamic data 116 may be correlated with the (e.g., real time) location data 114 to further determine risk, which may affect the determination of insurance policy characteristic(s) 128 and/or route recommendation(s) 130.

In some examples, the analysis module(s) 122 may also employ static data 136 to generate one or both of the complexity metric(s) 124 or the similarity metric(s) 126. The static data 136 may include, but is not limited to, one or more of the following: road configuration information (e.g., windy or straight); terrain information (e.g., city, rural, mountainous, flat, forests, plains); or information regarding the neighborhoods in proximity to the vehicle 102 (e.g., high or low accident frequency areas, etc.). The static data 136 may be received from data providers, such as mapping services, geographical survey services, government agencies, and so forth, and may be stored in data storage device(s) incorporated into or accessible from the analysis computing device(s) 120. The static data 136 may be accessed by the analysis module(s) 122 and employed to determine complexity metric(s) 124 or similarity metric(s) 126. The static data 136 may be correlated with the (e.g., real time) location data 114 to further determine risk, which may affect the determination of insurance policy characteristic(s) 128 and/or route recommendation(s) 130.

In some implementations, the complexity metric(s) 124, the similarity metric(s) 126, or both the complexity metric(s) 124 and similarity metric(s) 126 may be employed to determine one or more insurance policy characteristics 128 of one or more insurance policies. The insurance policies may include, but are not limited to: a vehicle (e.g., auto) insurance policy for the vehicle 102 associated with the driver 104, or for the diver 104; a life insurance policy for the driver 104; or a health insurance policy for the driver 104. Insurance policy characteristic(s) 128 may include, but are not limited to: a coverage type, a coverage amount, a limit of coverage (e.g., $100,000 per person, $300,000 per accident bodily injury coverage, etc.), a premium of an insurance policy; a deductible of an insurance policy; or any other price or cost of an insurance policy. In some implementations, the insurance policy characteristic(s) 128 may be stored and output (e.g., communicated) for presentation in a user interface (UI) 134 executing on one or more user device(s) 132. The UI 134 may be a component of an application associated with an insurance company. The UI 134 may present insurance policy information, including the insurance policy characteristic(s) 128, for one or more insurance policies associated with the user of the user device(s) 132.

In some implementations, the complexity metric(s) 124, the similarity metric(s) 126, or both the complexity metric(s) 124 and similarity metric(s) 126 may be employed to determine one or more route recommendation(s) 130 for the driver 104. The route recommendation(s) 130 may indicate one or more routes (e.g., safe, or low-risk routes) that may be traveled by the driver 104 during one or more trips using the vehicle 102 or another vehicle. The route recommendation(s) 130 may also be stored and output (e.g., communicated) for presentation in the UI 134. Route recommendation(s) 130 may be provided to the driver 104 in addition to, or instead of, altering insurance policy characteristics based on route complexity and/or similarity determinations. For example, implementations may determine that the driver 104 has been following routes that are high-risk routes based on their high complexity and/or lack of similarity to other routes driven by the driver 104. In such examples, implementations may recommend alternate routes that involve lower risk, and if the driver 104 follows the recommendations no changes may be made to the insurance policy characteristic(s) 128. In some implementations, if the driver 104 uses the recommended route(s) for at least a threshold number of trips, or for at least a threshold amount of time, the driver 104 may be rewarded with dynamically lowered insurance rates (e.g., for auto, health, life insurance, etc.) or with other rewards.

Route recommendation(s) 130 may be determined based on static and/or dynamic data and presented to the driver 104 prior to or at the beginning of a trip. For example, some implementations may determine that the driver 104 is about to leave for work, and retrieve data describing the typical route followed by the driver 104 on their way to work. In such examples, a recommendation may be made that indicates the safest, fastest route based on static and/or dynamic data prior to departure. Route recommendation(s) 130 may also be determined and presented to the driver 104 after the completion of a trip. For example, some implementations may determine that the driver 104 just finished taking a high risk route, and recommend an alternative route that the driver 104 may consider following on their next trip. Route recommendation(s) 130 may also be determined and presented (e.g., through an on-board navigation system) to the driver 104 during a trip, when the driver 104 is en route.

Determination of complexity metric(s) 124, and use of the complexity metric(s) 124 to determine insurance policy characteristic(s) 128 and route recommendation(s) 130, is further described with reference to FIG. 3. Determination of similarity metric(s) 126, and use of the similarity metric(s) 126 to determine insurance policy characteristic(s) 128 and route recommendation(s) 130, is further described with reference to FIG. 4.

In some examples, the user device(s) 132 include the mobile device 106. User device(s) 132 may also include one or more other devices operated by the driver 104 or other user(s). User device(s) 132 may include any type of computing device, including but not limited to personal computers, desktop computers, laptop computers, tablet computers, notebook computers, smartphones, personal data assistants (PDAs), wearable computers, implanted computers, server computers, cloud computing (e.g., distributed computing) devices, onboard vehicle computers, and so forth.

Figure 2:
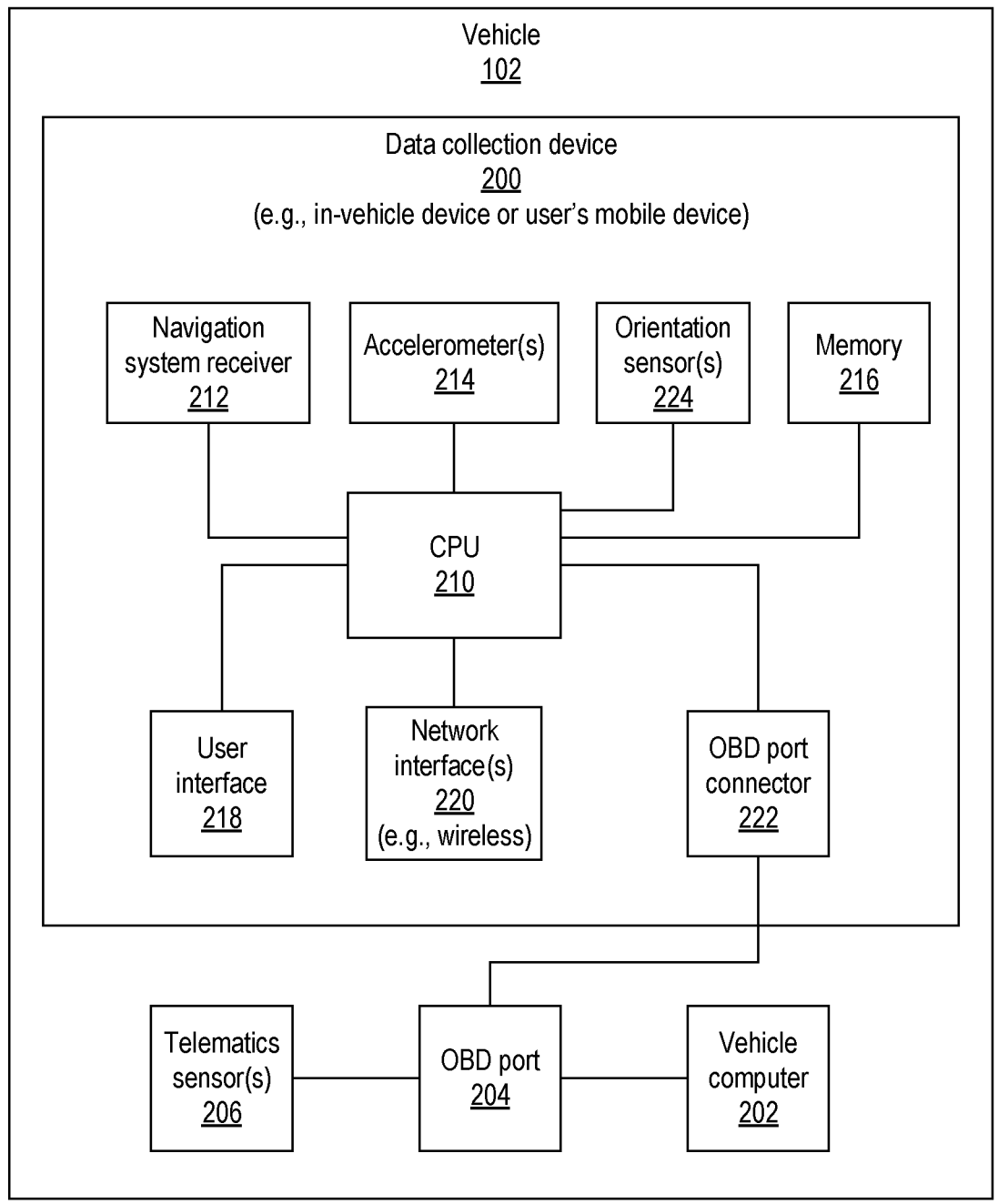
FIG. 2 depicts an example system for collecting data regarding vehicle operations according to implementations of the present disclosure.

FIG. 2 depicts an example system for collecting data (e.g., sensor data 110) regarding vehicle operations according to implementations of the present disclosure. As shown in FIG. 2, the system may include a vehicle 102 that includes a data collection device 200, such as the mobile device 106 or an in-vehicle (e.g., on-board) computing device. The vehicle 102 may include a vehicle computer 202, an on-board diagnostics (OBD) port 204, and/or one or more vehicle telematics sensors 206. The data collection device 200 may be connected to the vehicle 102 via an OBD port connector 222 that is connected to the OBD port 204 to receive telematics data (e.g., sensor data 110) and/or other information generated by the telematics sensor(s) 206 and/or the vehicle computer 202. Such information may be communicated to the data collection device 200 over the OBD port 204.

In some implementations, the data collection device 200 includes a central processing unit (CPU) 210, a (e.g., satellite-based) navigation system receiver 212, at least one accelerometer 214, at least one orientation sensor 224, a memory 216, a UI 218, and at least one (e.g., wireless) network interface 220. The CPU 210 may communicate with the other elements of the data collection device 200 to facilitate the operation of the data collection device 200. The CPU 210 may be configured to process data received from one or more of the navigation system receiver 212, the accelerometer(s) 214, the orientation sensor(s) 224, or the OBD port connector 222. Data processing may include receiving sensor data 110 from one or more of the navigation system receiver 212, the accelerometer(s) 214, the orientation sensor(s) 224, or the OBD port connector 222, and communicating the sensor data 110 to the analysis computing device(s) 120 using the network interface(s) 220. In some implementations, the CPU 210 may calculate one or both of the complexity metric(s) 124 or the similarity metric(s) 126 in addition to, or instead of, such calculations being performed on the analysis computing device(s) 120. The sensor data 110 may be communicated, over one or more networks, using any communication protocol or in any format. In some examples, the sensor data 110 may be compressed, encrypted, or both.

The navigation system receiver 212 may include an antenna and associated signal processing circuitry for receiving signals from global navigation satellite system (GNSS) satellites, and determining the location of the data collection device 200 based on the signals. GNSS satellites may be, for example, GPS, GLONASS, Galileo, or Beidou satellites which send time and orbital data which the data collection device 200 may use to calculate its location. In some implementations, the CPU 210 calculates the location of the data collection device 200 using the data received by the navigation system receiver 212. The CPU 210 may retrieve location data from the navigation system receiver 212 at set time intervals. The CPU 210 may send the location data to the memory 216 along with a timestamp (e.g., time and/or date) indicating when the data collection device 200 was at the location. In some implementations, the navigation system receiver 212 may be component of a separate navigation device used by the driver 104 for obtaining driving directions or location information. In such examples, the navigation system receiver 212 transmits data to the data collection device 200 though a wired connection or a wireless connection, e.g., BlueTooth or Wi-Fi.

The accelerometer(s) 214 may include any device that measures (e.g., proper) acceleration. Data collected from an accelerometer(s) 214 may include or be used for determining the g-force, acceleration, deceleration, orientation, shock, vibration, jerk, velocity, speed, and/or position of the data collection device 200 or vehicle 102. In some examples, acceleration data describing the acceleration or deceleration of the vehicle 102 may be collected from other systems of the vehicle 102, such as the brakes or accelerator systems of the vehicle 102, or from onboard telematics devices that collect information from the brakes or acceleration systems.

The orientation sensor(s) 224 may include any device that measures the orientation of the data collection device 200, or the vehicle 102, relative to any reference axis. Orientation sensor(s) 224 may measure yaw, pitch, or roll. Orientation sensor(s) 224 may also include a compass or other device that measures the direction of the data collection device 200, or the vehicle 102, with respect to a magnetic field such as the Earth's magnetic field. In some examples, orientation sensor(s) 224 include one or more gyroscope-based sensors that detect change in orientation relative to one or more axes.

The sensor data 110 from one or more of the OBD port connector 222, the navigation system receiver 212, the accelerometer(s) 214, or the orientation sensor(s) 224 may be received by the CPU 210. The CPU 210 may collect data at intervals, or continuously, and store the data in the memory 216. Each data element may be associated with a timestamp and/or a location stamp indicating a location where the data was collected. In some implementations, the CPU 210 determines intervals between data stored in the memory 316 based on trends in the data. The rate of data collection or storage may vary based on the route complexity. For example, if a driver is traveling along a straight road at a consistent speed, the CPU 210 may save data less frequently than if the driver is making frequent turns. In some implementations, exception data that characterizes safety events or other unusual driving behavior may be stored. For example, the CPU 210 may only save accelerations, decelerations, hard turns, speeds, lane change speeds, and so forth with rates above a certain threshold.

The OBD port connector 222 may be used to collect data from the vehicle computer 202 and/or vehicle telematics sensor(s) 206 via the OBD port 204. The vehicle computer 202 may provide information about the vehicle's speed, the number of miles traveled, whether the vehicle is running or not, seatbelt usage, airbag deployment, vehicle diagnostics, or other information. Vehicle diagnostics data can be used to determine whether a safety event was caused by the driver's actions or related to a vehicle malfunction, such as low tire pressure, low oil pressure, high engine temperature, loss of power, or stalling. The vehicle 102 may include additional telematics sensors 206 for vehicle tracking, monitoring fuel consumption, vehicle safety, or other purposes. Data obtained by the data collection device 200 from the vehicle computer 202 and telematics sensor(s) 206 via the OBD port 204 can supplement or be used instead of data collected by the other components of the data collection device 200. In some implementations, the data collection device 200 turns on automatically when the vehicle 102 is turned on. The data collection device 200 may be powered by the vehicle 102, or may have its own power source.

The data collection device 200 may include network interface(s) 220 for sending collected sensor data 110 to the analysis computing device(s) 120 via one or more wired or wireless networks. The data collection device 200 may also be configured to communicate with the driver 104 or a passenger via the UI 218. The UI 218 may include output components, such as a display, speakers, or haptic output component(s). The UI 218 may also include input components, such as a touch screen, keyboard, or audio input device (e.g., microphone). In some implementations, the UI 218 may receive and present data such as the insurance policy characteristic(s) 128 or the route recommendation(s) 130. The UI 218 may also present other information such as vehicle diagnostics data, or sensor data 110 collected from the navigation system receiver 212, the accelerometer(s) 214, the orientation sensor(s) 224, or the OBD port 204. In some implementations, the data collection device 200 may operate as a navigation device that can calculate and display a route to a destination inputted by the driver 104.

The data collected by the data collection device 200 may include telematics data that is receive from various components and/or over various channels, such as OBD device(s), in-vehicle interface(s), integrated or removable infotainment systems, mobile devices communicating with vehicle systems through API(s), and so forth. The UI 218 may provide output in any appropriate form using various interface(s), including output through a smartphone or other mobile device, onboard displays in dashboard or on windshield, and so forth. The UI 218 may present output as visually presented information, audio information (e.g., voice output, tones, beeps, music, etc.), and/or through other output modes. User interaction with the UI 218 may be enabled when the vehicle is turned off and/or when the vehicle is turned on, when the vehicle is moving and/or still, and/or in other states. In some instances, user interaction may be enabled for drivers and/or passengers.

Figure 3:
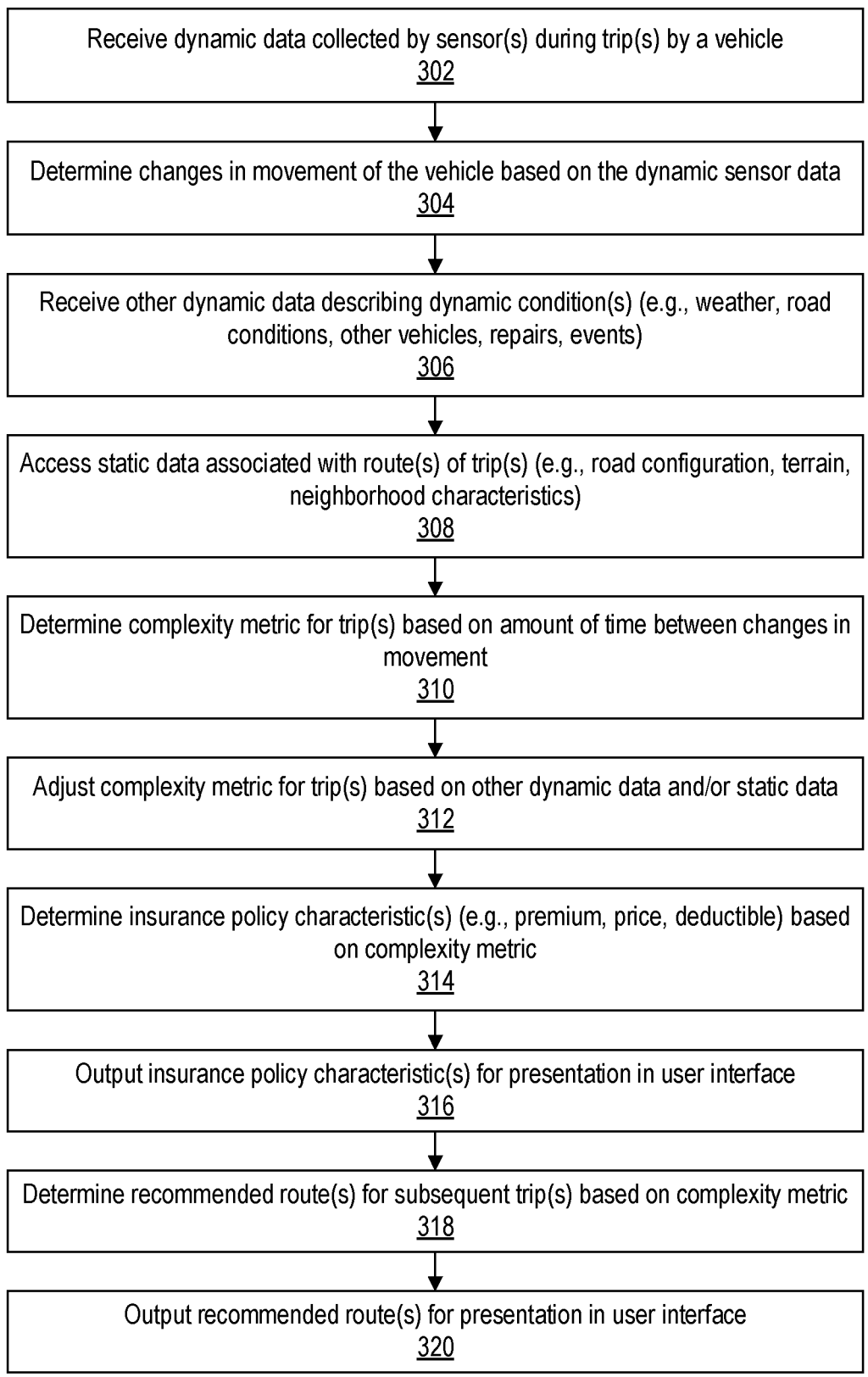
FIG. 3 depicts a flow diagram of an example process for determining insurance policy characteristics based on a complexity metric, according to implementations of the present disclosure.

FIG. 3 depicts a flow diagram of an example process for determining insurance policy characteristics 128 based on a complexity metric 124, according to implementations of the present disclosure. Operations of the process may be performed by one or more of the analysis module(s) 122 or other software module(s) executing on the analysis computing device(s) 120, the mobile device 106, the data collection device 200, the CPU 210, the vehicle computer 202, the user device(s) 132, or elsewhere.

Dynamic data, such as the sensor data 110, is received (302). The dynamic data may be collected during one or more trips by one or more vehicles 102 along one or more routes. The vehicle(s) 102 may be operated by a same driver 104 or by multiple different drivers 104 at different times.

Based on the dynamic sensor data 110, one or more changes in movement of the vehicle 102 may be determined (304). In some implementations, the sensor data 110 may include movement data 112 that describes the position, speed, acceleration, orientation, or direction of the vehicle 102 at multiple times (e.g., timestamps), and the changes in movement may be determined based on an analysis of such data. In some implementations, the sensor data 110 itself, e.g., the movement data 112, may indicate the changes in movement of the vehicle 102.

In some implementations, other dynamic data 116 may also be received (306). The other dynamic data 116 may describe dynamically changing road, weather, and traffic conditions, the number of other vehicle(s) in proximity to the vehicle 102 (e.g., the presence or absence of other vehicle(s)), or the occurrence of event(s). The other dynamic data may also describe characteristics of the vehicles in proximity to the vehicle 102, such as the type of vehicle, type of driver, type or amount of insurance, etc. For instance, a vehicle nearby with no insurance may present a higher risk, or an autonomous vehicle may present a lower risk.

In some implementations, static data 136 is accessed (308). The static data 136 may include information that changes less frequently than the dynamic data, such as road configuration, terrain characteristics, or neighborhood characteristics.

Figure 5:
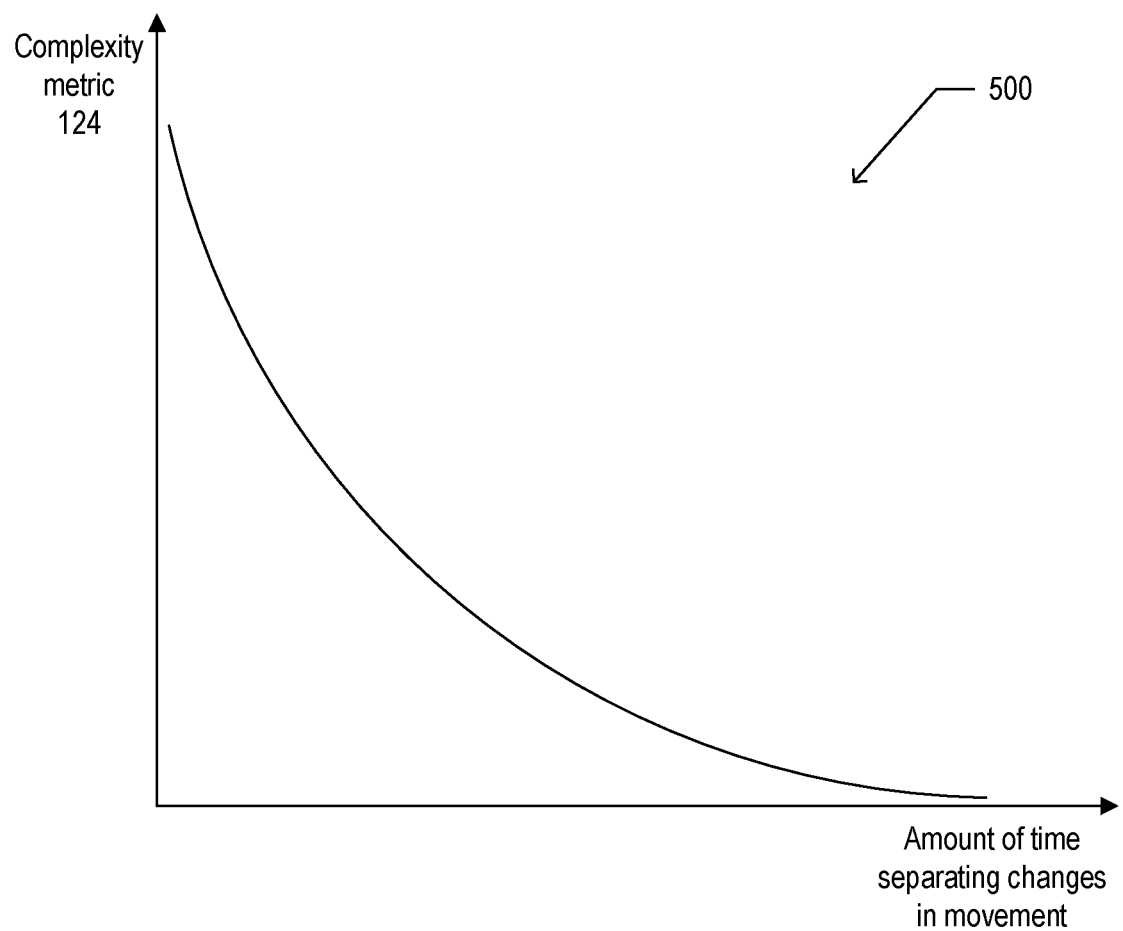
FIG. 5 depicts an example schematic of a complexity metric that varies according to an amount of time separating changes in movement, according to implementations of the present disclosure.

One or more complexity metrics 124 may be determined (310) based on the amount of time between changes in movement described in the sensor data 110. In some implementations, a complexity metric 124 is determined for each trip performed by a vehicle 102. The complexity metric 124 may indicate a degree of complexity of the trip, based on the time distribution of movement changes (e.g., direction changes, orientation changes, or speed changes) during the trip. For example, a trip with a large number of movement changes in a particular time period may be assigned a complexity metric 124 that is higher than that of another trip that includes fewer movement changes in a time period of similar duration. Accordingly, the complexity metric 124 for a trip may vary inversely according to the amount of time separating changes in movement. FIG. 5 depicts an example 500 of the complexity metric 124 showing such an inverse variation with amount of time separating changes in movement. The complexity metric 124 may also be described as varying directly with a frequency in changes in movement. For example, a higher frequency of changes may correspond to a higher complexity metric 124 for a trip.

Returning to FIG. 3, in some implementations the complexity metric 124 may be adjusted (312), or further determined, based on one or more of the other dynamic data 116 or the static data 136.

One or more insurance policy characteristics 128 may be determined (314) based on the complexity metric(s) 124 calculated for one or more trips by the vehicle 102 or by the driver 104 of the vehicle 102 or other vehicle(s). The insurance policy characteristic(s) 128 may include coverage type(s), coverage amount(s), deductible(s), premium(s), price(s), or other characteristic(s). In some examples, a higher complexity metric 124, or a higher aggregate (e.g., average) of multiple complexity metrics 124, may lead to a determination of higher premiums, deductibles, or prices for an insurance policy. The insurance policy characteristic(s) 128 may be stored and output (316) for presentation on a UI such as the UI 134 or the UI 218.

In some implementations, one or more route recommendations 130 may be determined (318) based at least partly on the complexity metric(s) 124. The route recommendation(s) 130 may be output (320) for presentation in a UI such as the UI 134 or the UI 218. In some implementations, an indication may be received describing a proposed trip to be taken by the driver 104 and/or the vehicle 102. The proposed trip may include a starting location and an ending location. Multiple candidate routes may be identified from the starting location to the ending location. Each candidate route may be analyzed to determine a complexity metric 124 for the candidate route. The complexity metric 124 for a candidate route may be based on historical data indicating the changes in movement performed by one or more vehicles 102 that previously followed the candidate route. In some examples, the recommended route may be the candidate route having the lowest complexity metric 124 among the candidate routes. In this way, implementations may recommend a route exhibiting minimal complexity, which may reduce the likelihood of accidents or other incidents occurring on the route. In some implementations, the route recommendation(s) 130 may be determined, at least in part, to minimize travel time. For example, current road conditions, traffic conditions, current accident data, weather, events, or other criteria may be used to determine route recommendation(s) 130 to minimize travel time while also minimizing complexity (and thus risk) for the route(s).

In some implementations, the complexity metric 124 of a trip may be calculated based on the amount of time between, frequency of, or time distribution of changes in movement exhibited by the vehicle 102 during the trip. In some implementations, the complexity metric 124 of a trip may be calculated based on the sensor data 110 (e.g., without regard to the changes in movement). In some implementations, the complexity metric 124 of a trip may be calculated based on the sensor data 110 (e.g., without regard to the changes in movement) and one or both of the static data 136 or the other dynamic data 116. The insurance policy characteristic(s) 128, the route recommendation(s) 130, or both may be determined based on a single complexity metric 124 for a single trip, or based on an aggregate complexity metric 124 for multiple trips by the vehicle 102 or by the driver 104 in one or more vehicles. The aggregate complexity metric 124 may be an average, median, mean, mode, or other statistical combination of the multiple complexity metrics 124 of the multiple trips.

Figure 4A:
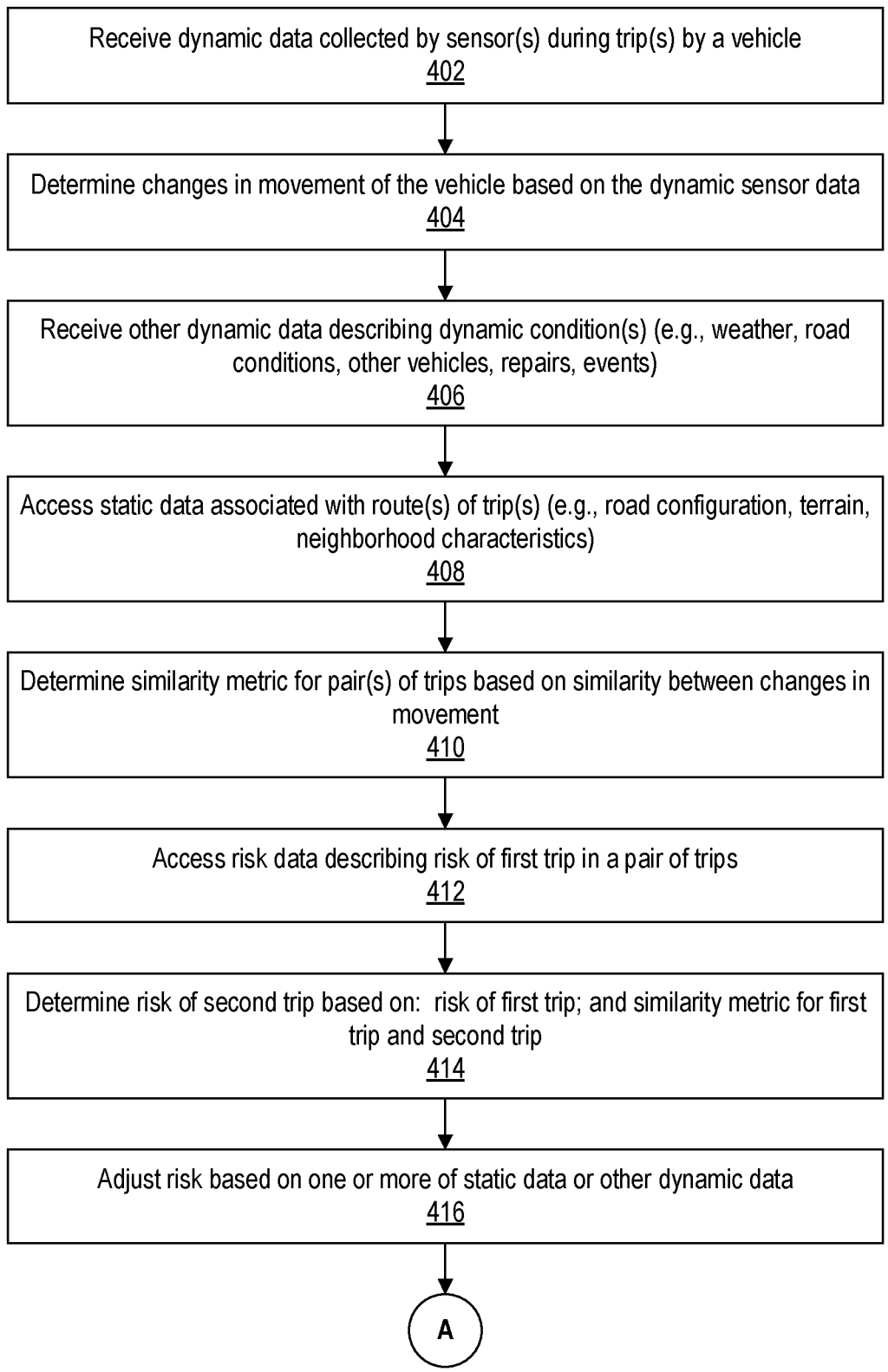
FIGS. 4A and 4B depict a flow diagram of an example process for determining insurance policy characteristics based on a similarity metric, according to implementations of the present disclosure.
Figure 4B:
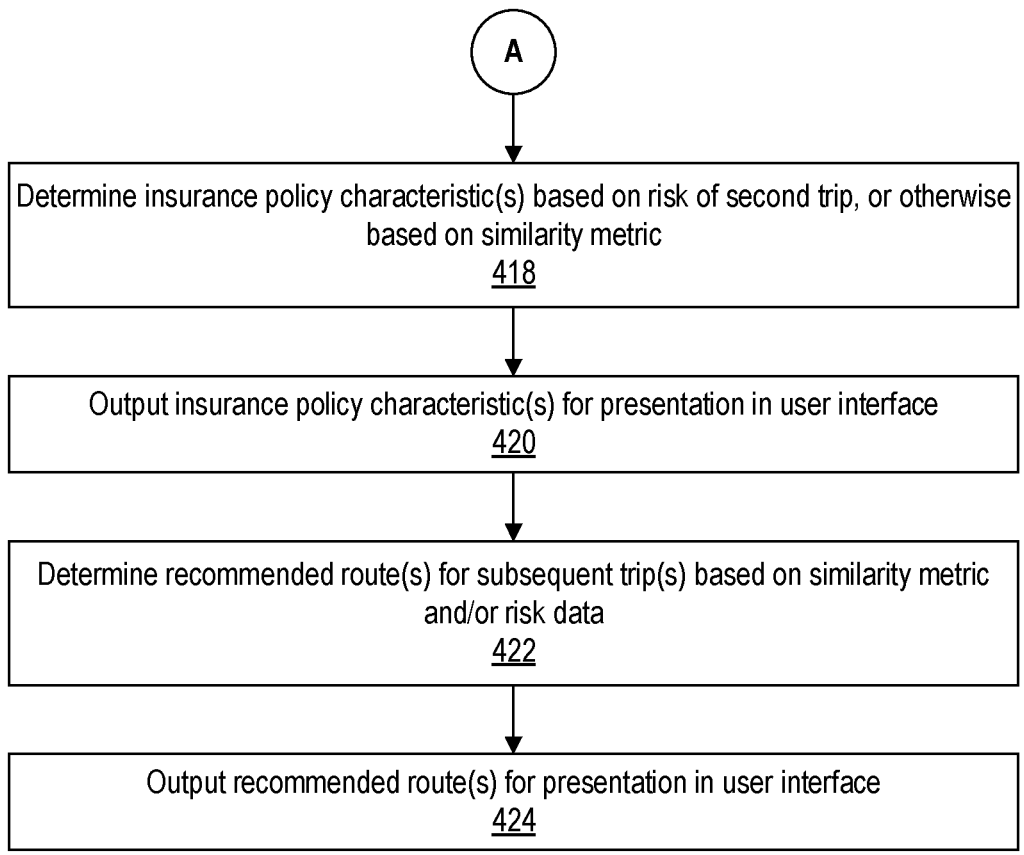

FIGS. 4A and 4B depict a flow diagram of an example process for determining insurance policy characteristics 128 based on a similarity metric 126, according to implementations of the present disclosure. Operations of the process may be performed by one or more of the analysis module(s) 122 or other software module(s) executing on the analysis computing device(s) 120, the mobile device 106, the data collection device 200, the CPU 210, the vehicle computer 202, the user device(s) 132, or elsewhere.

With reference to FIG. 4A, dynamic data is received (402), such as the sensor data 110. The dynamic data may be collected during one or more trips by one or more vehicles 102 along one or more routes. The vehicle(s) 102 may be operated by a same driver 104 or by multiple different drivers 104 at different times.

Based on the dynamic sensor data 110, one or more changes in movement of the vehicle 102 may be determined (404). In some implementations, the sensor data 110 may include movement data 112 that describes the position, speed, acceleration, orientation, or direction of the vehicle 102 at multiple times (e.g., timestamps), and the changes in movement may be determined based on an analysis of such data. In some implementations, the sensor data 110 itself, e.g., the movement data 112, may indicate the changes in movement of the vehicle 102.

In some implementations, other dynamic data 116 may also be received (406). The other dynamic data 116 may describe dynamically changing road, weather, and traffic conditions, the presence of other vehicle(s) in proximity to the vehicle 102, or the occurrence of event(s).

In some implementations, static data 136 is accessed (408). The static data 136 may include information that changes less frequently than the dynamic data, such as road configuration, terrain characteristics, or neighborhood characteristics.

A similarity metric 126 may be determined (410) for each of one or more pairs of trips. The similarity metric 126 for a pair of trips may be based on a similarity between the changes in movement by a vehicle 102 on each of the pair of trips. In some examples, the similarity metric 126 may be calculated between a pair of trips that have a different starting location, a different ending location, or different starting and ending locations. For example, a similarity metric 126 may be calculated between two trips by the driver 104, or the vehicle 102, in two different geographic regions. The similarity metric 126 may be calculated between trips of a same vehicle 102 or different vehicles. The similarity metric 126 may be calculated between trips of a same driver 104 or different drivers.

In some implementations, risk data is accessed (412). The risk data may describe, for each of one or more routes, a record of accidents or other incidents that were experienced by drivers or vehicles on the routes. Accordingly, the risk data may indicate whether a particular route is high, medium, or low risk based on the history of accidents or other incidents that occurred on the route. The risk data may indicate the risk of a particular route corresponding to a first trip in a pair of trips for which the similarity metric 126 has been determined.

A risk of the second trip in the pair may be determined (414) based on: the risk of the first trip, as indicated in the risk data; and the similarity metric 126 indicating the similarity between the first trip and the second trip in the pair. For example, if the similarity metric 126 indicates a high similarity between the first and second trips, the second trip may be designated to have a similar risk (e.g., high, medium, or low) to that of the first trip. If the similarity metric 126 indicates a low similarity between the first and second trips, the risk of the second trip may be determined to be substantially independent of the risk of the first trip, and other information may be employed to determine the risk of the second trip.

In some implementations, the risk may be adjusted or otherwise determined based on one or both of the static data 136 or the other dynamic data 116. The process may continue as described with reference to FIG. 4B.

One or more insurance policy characteristics 128 may be determined (418) based on the risk of the second trip or otherwise based on the similarity metric(s) 126. In some implementations, a plurality of previous trips of the driver 104 or the vehicle 102 may be analyzed to determine similarity between pairs of trips. If the previous trips exhibit a higher than threshold aggregate similarity, the insurance policy characteristic(s) 128 (e.g., premiums, deductibles, prices) may be set lower for the driver 104. Accordingly, a policy may be priced lower for those drivers 104 who exhibit similar driving habits along similar routes, given that such drivers 104 may be less likely to experience accidents. In some implementations, one or more future trips (e.g., the second trip in the example above) may be analyzed to determine a similarity between the future trip(s) and the previous trips of a driver 104 or a vehicle 102. If future trip(s) are planned along routes that will involve a similar set of movement changes compared to previous trips, the policy may be priced lower. If future trip(s) are planned along dissimilar routes, the policy may be priced higher given that the driver 104 may be at higher risk for accidents along dissimilar routes.

It should be noted that, in at least some implementations, the similarity metric 126 measures the similarity between trips (or between routes) based on a similarity of movement changes. The compared trips may have different starting locations and/or different ending locations. In some examples, the compared trips may be in different geographical regions (e.g., different cities, counties, states, provinces, countries, and so forth). Thus, the similarity metric may indicate that a first route is similar to a second route even though the driver 104 may be familiar with the first route but unfamiliar with the second route. In this way, implementations may determine similarity independently of the familiarity, or lack of familiarity, of drivers with routes.

The insurance policy characteristic(s) 128 may be stored and output (420) for presentation on a UI such as the UI 134 or the UI 218.

In some implementations, one or more route recommendations 130 may be determined (422) based at least partly on the similarity metric(s) 126. The route recommendation(s) 130 may be output (424) for presentation in a UI such as the UI 134 or the UI 218. In some implementations, an indication may be received describing a proposed trip to be taken by the driver 104 and/or the vehicle 102. The proposed trip may include a starting location and an ending location. Multiple candidate routes may be identified from the starting location to the ending location. Each candidate route may be analyzed to determine a similarity metric 126 indicating a similarity between the candidate route and one or more routes previously traveled by the driver 104 or the vehicle 102. In some examples, the recommended route may be identified as the candidate route that exhibits a maximum similarity to previous routes that were (e.g., safely) traveled by the driver 104. In some implementations, the route recommendation(s) 130 may be determined, at least in part, to minimize travel time. For example, current road conditions, traffic conditions, accident data, weather, events, or other criteria may be used to determine route recommendation(s) 130 to minimize travel time while also minimizing risk by selecting route(s) that are similar to route(s) previously used by the driver 104. Although examples herein may describe determining route similarity between routes followed by a same vehicle driven by a same driver, implementations are not so limited. In some implementations, a route similarity may be determined between routes followed by different vehicles driven by a same driver, routes followed by the same vehicle driven by different drivers, and/or routes followed by different vehicles driven by different drivers. For example, a particular driver may occasionally drive a rental vehicle or a borrowed vehicle.

Figure 6:
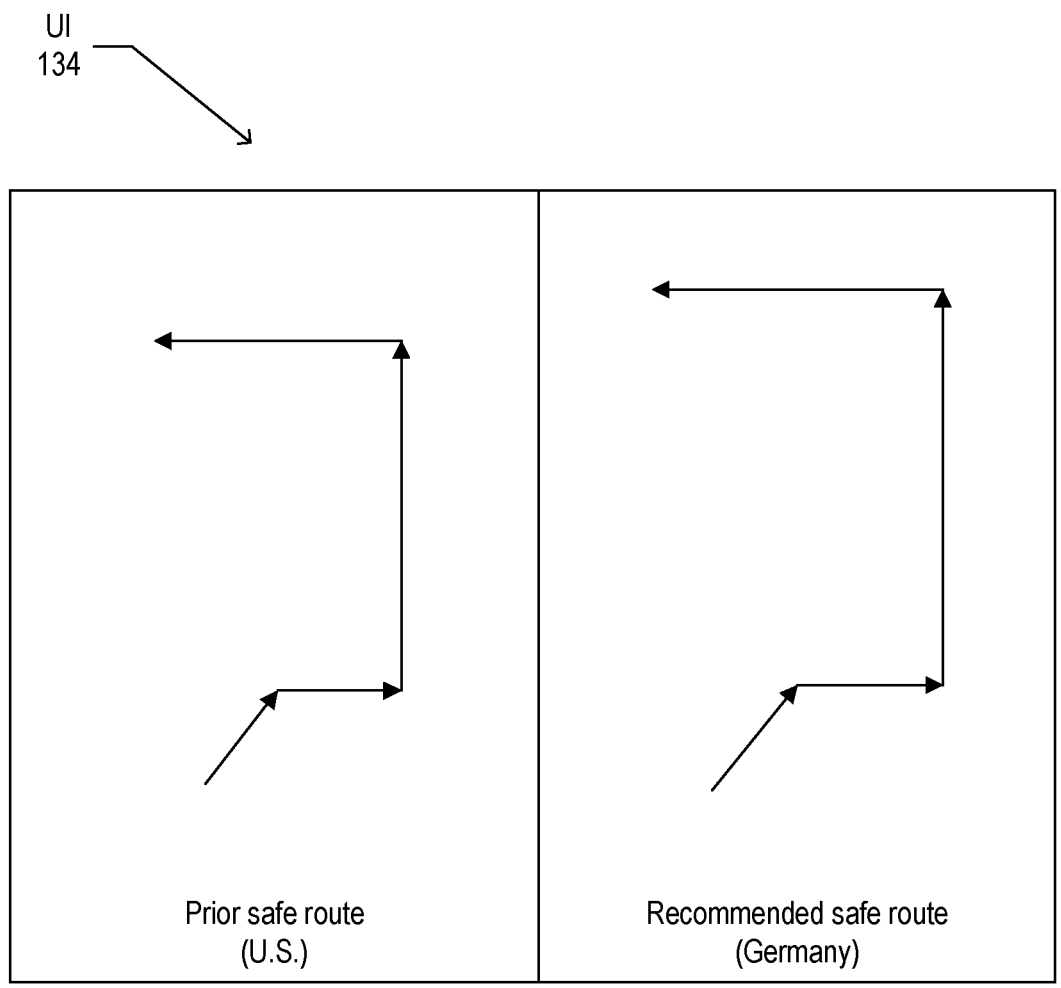
FIG. 6 depicts an example user interface presenting route recommendations determined based on a similarity metric, according to implementations of the present disclosure.

FIG. 6 depicts an example of the UI 134 presenting a recommended route for a driver 104. This example depicts a scenario in which the driver 104 is traveling in (or has moved to) Germany from the United States, and may be operating a vehicle 102 in an unfamiliar area. The driver 104 may specify a particular trip in Germany, including a starting location and an ending location. Implementations may identify various candidate routes for the proposed trip. A similarity metric 126 may be calculated between each candidate route and one or more routes previously traveled by the driver 104 (e.g., in the United States). A recommended route may be identified which exhibits a similar sequence of movement changes to the previously traveled route(s). In this way, at least some implementations may identify a recommended safe route for the driver 104 that is similar to those route(s) previously traveled (e.g., safely) by the driver 104.

In some implementations, a model may be developed which describes, for a driver 104, a pattern of routes traveled based on similarity between routes, wherein the similarity is based on similar patterns in movement changes as described above. In such examples, the driver's activities may be monitored to detect whether, and to what extent, the driver 104 deviates from the model on a particular trip. Detected deviations may lead to changes in the insurance policy characteristic(s) 128 for the driver 104. In some implementations, the driver's pattern may be compared to patterns of other drivers, and insurance policy characteristic(s) 128 may be determined based on the comparison. For example, drivers 104 who live in a particular region and who exhibit similar demographic characteristics may be given similar insurance policy characteristic(s) 128 if they exhibit similar driving patterns.

The above example describes using complexity metric(s) 124, similarity metric(s) 126 or both to determine a risk that a driver 104, or a vehicle 102, may experience an accident on a current trip or on future trips. A higher risk of accidents may lead to an increase in insurance policy characteristic(s) 128 (e.g., increased price and/or premium), or a determination of route recommendation(s) 130 to lower the risk. Other information, such as the static data 136 or the other dynamic data 116, may additionally be employed to determine risk, and thus determine insurance policy characteristic(s) 128 or route recommendation(s) 130. The following factors may affect the risk determination, in addition to complexity or similarity: the presence of one or more large trucks or trailers (e.g., 18-wheelers) in the vicinity of the vehicle 102; different road conditions, such as a rural road or a highway in a city; driving at night vs. during the day; driving in zones with high accident frequency; driving in construction areas; information from the vehicle 102, such as condition of the car, odometer reading, status of tires, drive train conditions, weight of vehicle 102; ability of vehicle 102 to drive in a particular terrain or on particular road conditions; driving into the sun; road conditions (e.g., potholes, sharp curves, inclines); weather conditions; and so forth.

In some implementations, insurance policy characteristic(s) 128 or route recommendation(s) 130 may be altered dynamically based on changes in dynamic data. For example, if the driver 104 drives into a high accident frequency area or into a mountainous region unsuitable for the vehicle 102, the route recommendation(s) 130 may be dynamically altered and presented to guide the driver 104 to lower risk areas. The insurance policy characteristic(s) 128 may also be dynamically adjusted in accordance with the higher risk activity of the driver 104.

Although examples herein may describe using complexity metric(s) 124 or similarity metric(s) 126 to determine insurance policy characteristic(s) 128 or route recommendation(s) for individual drivers 104, implementations are not so limited. Implementations may also be employed to determine one or both of insurance policy characteristic(s) 128 or route recommendation(s) for a fleet of vehicles maintained and operated by a business, government agency, or other organization. In some implementations, complexity and/or similarity determinations may be made across a fleet of vehicles instead of, or in addition to, being determined for individual vehicle(s).

In some implementations, the complexity metric(s) may be used to perform other operations. For example, a higher complexity metric may be based on increased breaking or more abrupt acceleration or decelerations, and such activities may lead to a recommendation that the driver have maintenance performed on the vehicle to check brakes, tune up the engine, check the tires, and so forth. The complexity metric(s) may also be used to generate safety recommendations for the driver, e.g., to encourage the driver to drive less aggressively, take a defensive driving course, and so forth.

In some implementations, sensor data 110 may be received from external sensor(s) 108 that are components of other vehicles, such as other vehicles that are in proximity to the vehicle 102 for which the complexity metric(s) and/or similarity metric(s) are determined. For example, the vehicle 102 may be included in a set of connected and/or networked vehicles that share information regarding traffic conditions, road maintenance, accidents, events, weather, road conditions, and so forth. The complexity metric(s) and/or similarity metric(s) may be determined based at least partly on information received from a system of connected and/or networked vehicles.

Although examples herein may describe the driver 104 as a human driver, implementations are not limited to such scenarios. In some instances, the vehicle 102 may be operated by an artificial intelligence (AI), such that the vehicle 102 is autonomous, semi-autonomous, and/or driverless. In such instances, the policy for which characteristics are determined may be a policy that is associated with the vehicle and/or with an individual who is the owner of the vehicle 102 but not always a driver of the vehicle. Moreover, the route recommendation(s) described herein may be provided to the AI that operates the vehicle instead of, or in addition to, being provided to a human driver of the vehicle. Moreover, in instances where the vehicle 102 is operated by an AI, the complexity metric may be employed as a quality metric that may be used to compare the performance of different Ms. For example, a high complexity metric may indicate that an AI is causing the vehicle to change direction, speed, and/or acceleration frequently. If a different AI has a lower complexity metric, determined along a same or similar stretch of road, that may indicate that the different AI performs better by creating a smoother, more consistent riding experience over the same or similar stretch of road.

The route recommendations herein may be further based on driver-indicated waypoint(s). For example, if the driver indicates (e.g., through an app on their mobile device) that they wish to stop at an auto shop to receive vehicle maintenance, the route recommendation may take this preference into account. Moreover, route recommendations may be based on negative requests expressed by the driver. For example, the driver may indicate that they wish to avoid a particular highway, and the route recommendations may be made accordingly. In some instances, route recommendations may employ machine learning to learn, over time, the driver's preferences. For example, the system may learn over time that the driver tends to avoid a particular highway, and route recommendations may take into account this inferred preference of the driver. In some implementations, route recommendations may be further based on partnerships with various businesses. For example, a business may partner with a provider of the recommendation service such that the recommended routes are in proximity to the business. As a particular example, if a coffee shop partners with the provider of the recommendation service, and the driver indicates that a route waypoint is to include a coffee shop, the route recommendation may guide the driver to the partner coffee shop.

Figure 7:
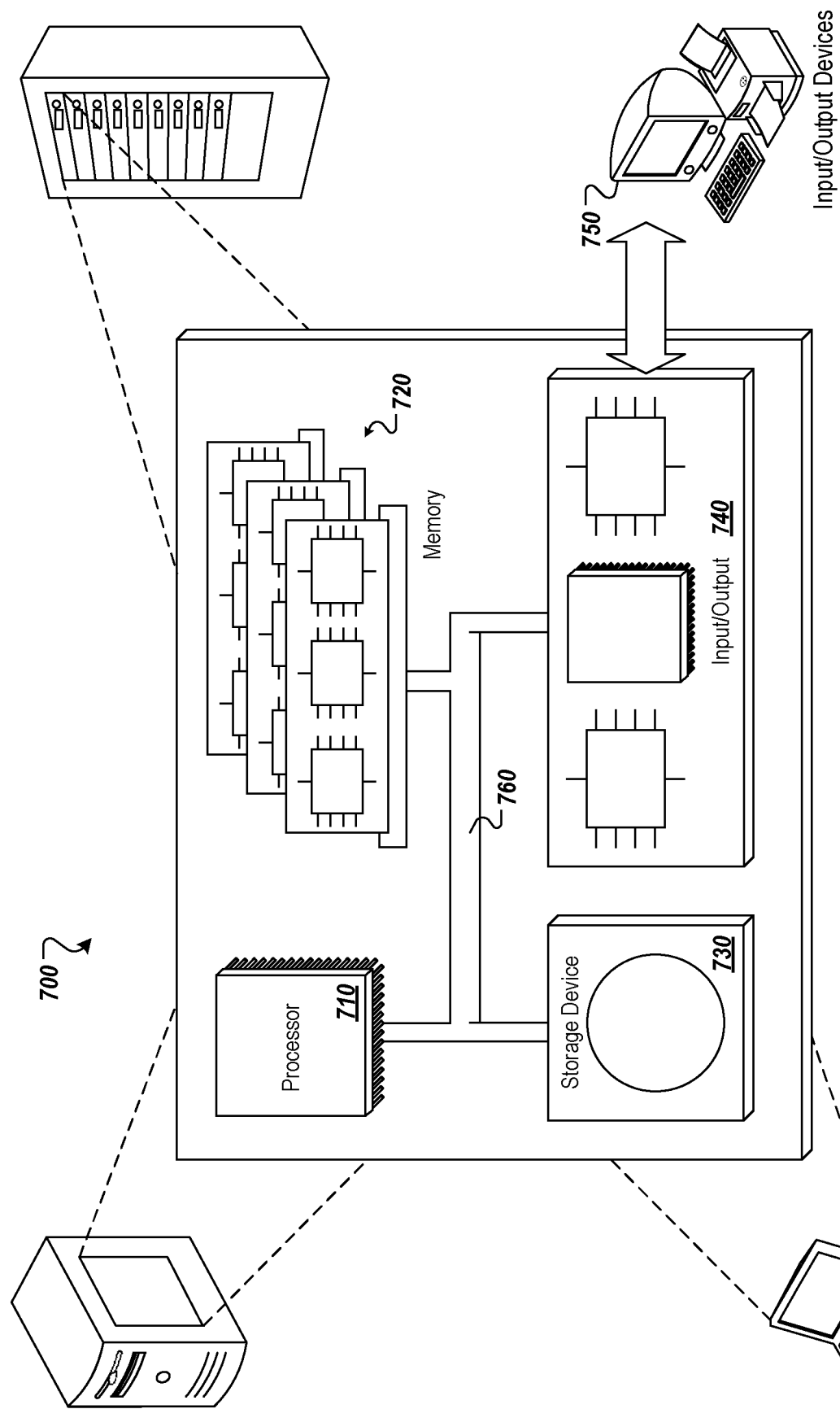
FIG. 7 depicts an example computing system, according to implementations of the present disclosure.

FIG. 7 depicts an example computing system, according to implementations of the present disclosure. The system 700 may be used for any of the operations described with respect to the various implementations discussed herein. For example, the system 700 may be included, at least in part, in one or more of the user device(s) 132, mobile device(s) 106, analysis computing device(s) 120, or data collection device(s) 200 described herein. The system 700 may include one or more processors 710, a memory 720, one or more storage devices 730, and one or more input/output (I/O) devices 750 controllable via one or more I/O interfaces 740. The various components 710, 720, 730, 740, or 750 may be interconnected via at least one system bus 760, which may enable the transfer of data between the various modules and components of the system 700.

The processor(s) 710 may be configured to process instructions for execution within the system 700. The processor(s) 710 may include single-threaded processor(s), multi-threaded processor(s), or both. The processor(s) 710 may be configured to process instructions stored in the memory 720 or on the storage device(s) 730. The processor(s) 710 may include hardware-based processor(s) each including one or more cores. The processor(s) 710 may include general purpose processor(s), special purpose processor(s), or both.

The memory 720 may store information within the system 700. In some implementations, the memory 720 includes one or more computer-readable media. The memory 720 may include any number of volatile memory units, any number of non-volatile memory units, or both volatile and non-volatile memory units. The memory 720 may include read-only memory, random access memory, or both. In some examples, the memory 720 may be employed as active or physical memory by one or more executing software modules.

The storage device(s) 730 may be configured to provide (e.g., persistent) mass storage for the system 700. In some implementations, the storage device(s) 730 may include one or more computer-readable media. For example, the storage device(s) 730 may include a floppy disk device, a hard disk device, an optical disk device, or a tape device. The storage device(s) 730 may include read-only memory, random access memory, or both. The storage device(s) 730 may include one or more of an internal hard drive, an external hard drive, or a removable drive.

One or both of the memory 720 or the storage device(s) 730 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 700. In some implementations, the CRSM may include a data store that provides storage of computer-readable instructions or other information in a non-transitory format. The CRSM may be incorporated into the system 700 or may be external with respect to the system 700. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 710 and the memory 720 may be supplemented by, or incorporated into, one or more application-specific integrated circuits (ASICs).

The system 700 may include one or more I/O devices 750. The I/O device(s) 750 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 750 may also include one or more output devices such as a display, LED(s), an audio output device (e.g., a speaker), a printer, a haptic output device, and so forth. The I/O device(s) 750 may be physically incorporated in one or more computing devices of the system 700, or may be external with respect to one or more computing devices of the system 700.

The system 700 may include one or more I/O interfaces 740 to enable components or modules of the system 700 to control, interface with, or otherwise communicate with the I/O device(s) 750. The I/O interface(s) 740 may enable information to be transferred in or out of the system 700, or between components of the system 700, through serial communication, parallel communication, or other types of communication. For example, the I/O interface(s) 740 may comply with a version of the RS-232 standard for serial ports, or with a version of the IEEE 1284 standard for parallel ports. As another example, the I/O interface(s) 740 may be configured to provide a connection over Universal Serial Bus (USB) or Ethernet. In some examples, the I/O interface(s) 740 may be configured to provide a serial connection that is compliant with a version of the IEEE 1394 standard.

The I/O interface(s) 740 may also include one or more network interfaces that enable communications between computing devices in the system 700, or between the system 700 and other network-connected computing systems. The network interface(s) may include one or more network interface controllers (NICs) or other types of transceiver devices configured to send and receive communications over one or more networks using any network protocol.

Computing devices of the system 700 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 700 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter that stores and/or emits a machine-readable propagated signal, or a combination of one or more of these. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
   obtaining driving preferences associated with a driver, wherein the driving preferences are inferences from a machine learning model analysis of the driver's past trips;
   receiving data collected by a plurality of sensors during one or more trips by a vehicle along a route, the data indicating changes in movement of the vehicle during the one or more trips along the route and the plurality of sensors comprising:
      at least one sensor incorporated into the vehicle; and
      at least one external sensor in proximity to the vehicle at one or more times during the one or more trips;
   determining a first sequence of movements by the vehicle during the one or more trips based on changes in orientation, speed, and acceleration of the vehicle during the one or more trips;
   receiving data indicating a proposed trip to be taken by the vehicle, wherein the proposed trip has a starting location or an ending location that is different from a respective starting location or ending location of the route;
   identifying at least a first candidate route for the proposed trip and a second candidate route for the proposed trip;
   determining a first similarity metric between the first candidate route and the one or more trips, the first similarity metric indicating a similarity in a sequence of expected vehicle movements along the first candidate route with the first sequence of movements during the one or more trips;
   determining a second similarity metric between the second candidate route and the one or more trips, the second similarity metric indicating a similarity in a sequence of expected vehicle movements along the second candidate route with the first sequence of movements during the one or more trips, wherein the first candidate route and the second candidate route incorporate the driving preferences;
   selecting, based on the first similarity metric and the second similarity metric, the first route as a recommended route for the proposed trip; and
   providing the recommended route for presentation in a navigation interface of a computing device.

2. The method of claim 1, wherein selecting the first candidate route as the recommended route for the proposed trip comprises determining that the first similarity metric is greater than the second similarity metric.

3. The method of claim 1, wherein both the starting location and ending location of the proposed trip are different from the respective starting location and ending location of the route.

4. The method of claim 1, wherein the proposed trip is for a driver that is different than one or more other drivers of the one or more trips.

5. The method of claim 1, wherein the proposed trip is for a vehicle that is different than the one or more vehicles of the one or more trips.

6. The method of claim 1 further comprising receiving user input indicating preferences for the proposed trip, and wherein the first candidate route and the second candidate route incorporate the preferences.

7. The method of claim 6, wherein the preferences include one or more of a driver-indicated waypoint for the proposed trip or a request to avoid a location.

8. The method of claim 1 further comprising obtaining route data indicating one or more of road conditions along the first candidate route and the second candidate route, traffic conditions along the first candidate route and the second candidate route, and weather conditions along the first candidate route and the second candidate route, and
   wherein the recommended route is selected based on the first similarity metric, the second similarity metric, and the route data.

9. A system comprising:
   at least one processor; and
   a memory communicatively coupled to the at least one processor, the memory storing instructions which, when executed, cause the at least one processor to perform operations comprising:
      obtaining driving preferences associated with a driver, wherein the driving preferences are inferences from a machine learning model analysis of the driver's past trips;
      receiving data collected by a plurality of sensors during one or more trips by a vehicle along a route, the data indicating changes in movement of the vehicle during the one or more trips along the route and the plurality of sensors comprising:
         at least one sensor incorporated into the vehicle; and
         at least one external sensor in proximity to the vehicle at one or more times during the one or more trips;
      determining a first sequence of movements by the vehicle during the one or more trips based on changes in orientation, speed, and acceleration of the vehicle during the one or more trips;
      receiving data indicating a proposed trip to be taken by the vehicle, wherein the proposed trip has a starting location or an ending location that is different from a respective starting location or ending location of the route;
      identifying at least a first candidate route for the proposed trip and a second candidate route for the proposed trip;
      determining a first similarity metric between the first candidate route and the one or more trips, the first similarity metric indicating a similarity in a sequence of expected vehicle movements along the first candidate route with the first sequence of movements during the one or more trips;
      determining a second similarity metric between the second candidate route and the one or more trips, the second similarity metric indicating a similarity in a sequence of expected vehicle movements along the second candidate route with the first sequence of movements during the one or more trips, wherein the first candidate route and the second candidate route incorporate the driving preferences;
      selecting, based on the first similarity metric and the second similarity metric, the first route as a recommended route for the proposed trip; and providing the recommended route for presentation in a navigation interface of a computing device.

10. The system of claim 9, wherein selecting the first candidate route as the recommended route for the proposed trip comprises determining that the first similarity metric is greater than the second similarity metric.

11. The system of claim 9 further comprising receiving user input indicating preferences for the proposed trip, and
wherein the first candidate route and the second candidate route incorporate the preferences.

12. The system of claim 11, wherein the preferences include one or more of a driver-indicated waypoint for the proposed trip or a request to avoid a location.

13. The system of claim 9 further comprising obtaining route data indicating one or more of road conditions along the first candidate route and the second candidate route, traffic conditions along the first candidate route and the second candidate route, and weather conditions along the first candidate route and the second candidate route, and
wherein the recommended route is selected based on the first similarity metric, the second similarity metric, and the route data.

14. One or more non-transitory computer-readable storage media storing instructions which, when executed by at least one processor, cause the at least one processor to perform operations comprising:
obtaining driving preferences associated with a driver, wherein the driving preferences are inferences from a machine learning model analysis of the driver's past trips;
receiving data collected by a plurality of sensors during one or more trips by a vehicle along a route, the data indicating changes in movement of the vehicle during the one or more trips along the route and the plurality of sensors comprising:
at least one sensor incorporated into the vehicle; and
at least one external sensor in proximity to the vehicle at one or more times during the one or more trips;
determining a first sequence of movements by the vehicle during the one or more trips based on changes in orientation, speed, and acceleration of the vehicle during the one or more trips;
receiving data indicating a proposed trip to be taken by the vehicle, wherein the proposed trip has a starting location or an ending location that is different from a respective starting location or ending location of the route;
identifying at least a first candidate route for the proposed trip and a second candidate route for the proposed trip;
determining a first similarity metric between the first candidate route and the one or more trips, the first similarity metric indicating a similarity in a sequence of expected vehicle movements along the first candidate route with the first sequence of movements during the one or more trips;
determining a second similarity metric between the second candidate route and the one or more trips, the second similarity metric indicating a similarity in a sequence of expected vehicle movements along the second candidate route with the first sequence of movements during the one or more trips, wherein the first candidate route and the second candidate route incorporate the driving preferences;
selecting, based on the first similarity metric and the second similarity metric, the first route as a recommended route for the proposed trip; and
providing the recommended route for presentation in a navigation interface of a computing device.

15. The media of claim 14, wherein selecting the first candidate route as the recommended route for the proposed trip comprises determining that the first similarity metric is greater than the second similarity metric.

16. The media of claim 14 further comprising receiving user input indicating preferences for the proposed trip,
wherein the preferences include one or more of a driver-indicated waypoint for the proposed trip or a request to avoid a location, and
wherein the first candidate route and the second candidate route incorporate the preferences.

17. The media of claim 14 further comprising obtaining route data indicating one or more of road conditions along the first candidate route and the second candidate route, traffic conditions along the first candidate route and the second candidate route, and weather conditions along the first candidate route and the second candidate route, and
wherein the recommended route is selected based on the first similarity metric, the second similarity metric, and the route data.

\* \* \* \* \*